United States Patent Office 3,553,564
Patented Jan. 5, 1971

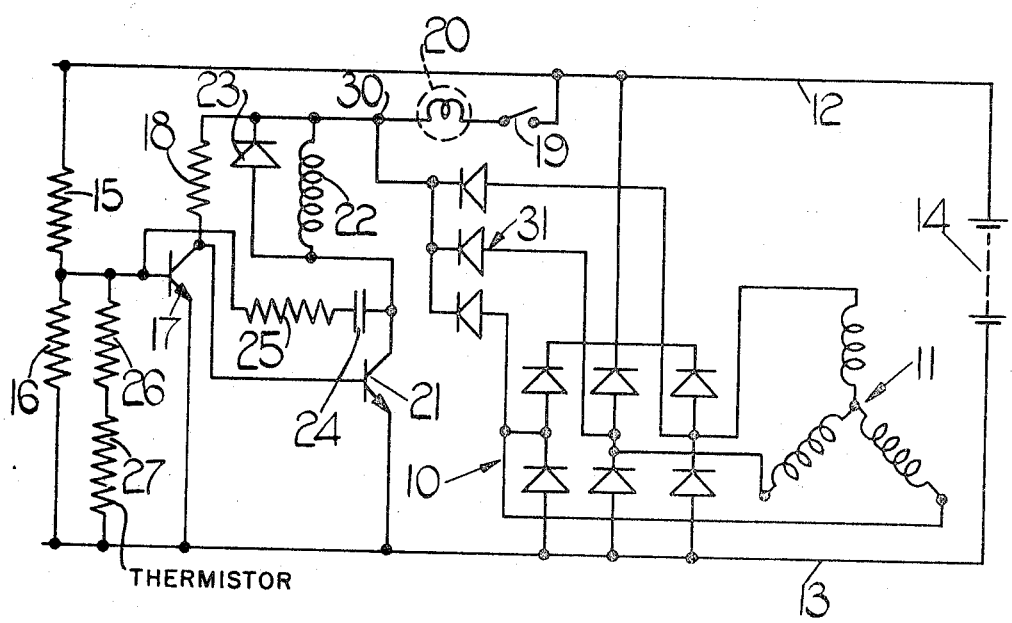

3,553,564
VOLTAGE REGULATORS WITHOUT A ZENER DIODE FOR BATTERY CHARGING SYSTEMS
Roger William Nolan, Redditch, England, assignor to Joseph Lucas (Industries) Limited, Birmingham, England, a British company
Filed Mar. 20, 1967, Ser. No. 624,441
Claims priority, application Great Britain, Apr. 5, 1966, 15,020/66
Int. Cl. H02j 7/14
U.S. Cl. 320—61                                    3 Claims

ABSTRACT OF THE DISCLOSURE

A known voltage regulator for a battery charging system in a road vehicle has a Zener diode sensing the battery voltage and providing base current to a control transistor which in turn regulates the generator output voltage. The invention eliminates the Zener diode by making use of the base-emitter diode of the control transistor as the voltage-sensing device.

This invention relates to voltage regulators for use in battery charging systems on road vehicles.

A voltage regulator according to the invention includes a voltage sensitive device for detecting the output voltage of the generator, and means controlled by the voltage sensitive device for regulating the generator output voltage, characterised in that the voltage sensitive device is constituted by the base-emitter diode of a transistor.

The accompanying drawing is a circuit diagram illustrating one example of the invention.

Referring to the drawing, a generator, which may be a dynamo and associated cut-out, but as shown is an alternator 11 and associated full wave rectifier 10, supplies power to positive and negative lines 12, 13 between which the battery 14 of a vehicle is connected in use. Connected between the lines 12, 13 are a pair of resistors 15, 16 in series, a point intermediate the resistors 15, 16 being connected to the base of an n-p-n transistor 17 the emitter of which is connected to the line 13, and the collector of which is connected to the line 12 through a resistor 18 in series with a warning lamp 20 and the ignition switch 19 of the vehicle. The collector of the transistor 17 is further connected to the base of a second n-p-n transistor 21, the emitter of which is connected to the line 12 through the field winding 22 of the generator 11 in series with the lamp 20 and the ignition switch 19'. The winding 22 is bridged by a diode 23 for conducting back E.M.F., and the collector of the transistor 21 is further connected to the base of the transistor through a capacitor 24 and a resistor 25 in series. The resistor 16 is bridged by a resistor 26 in series with a thermistor 27, and the junction of the lamp 20 with the components 18, 22, 23 is connected to the phases of the alternator 11 through three further diodes 31 respectively.

In operation, the resistors 15, 16 conduct continuously, but the power dissipated is negligible. When the ignition switch 19 is closed, current derived from the battery turns the transistor 21 on to excite the winding 22, and the warning lamp 20 is illuminated. However, when the engine is started and the alternator produces an output, the potentials of the junction 30 and the line 12 are substantially equal, and the lamp 20 is extinguished. So long as the output voltage of the generator is below a predetermined value, the transistor 21 remains bottomed by current flow through the diodes 31 and the resistor 18, and full field current still flows in the winding 22. Base-emitter current also flows in the transistor 17 both before and after the lamp 20 is illuminated, but because the characteristics of the base-emitter diode of the transistor 17, this current is very small, below the voltage at which regulation is required to commence, and so the collector-emitter current of the transistor 17 is negligible. The component values are so chosen that at the predetermined regulating voltage, the base-emitter current of the transistor 17 increases sharply, as permitted by the known diode characteristics, and at this point the transistor 17 starves the transistor 21 of base current, so that the transistor 21 turns off. By virtue of the feedback path by way of the capacitor 24 and resistor 25, the circuit oscillates between one state with the transistor 21 fully conductive and the transistor 17 off, and another state with the transistor 21 off and the transistor 17 fully conductive, the relative periods of conduction of the transistors being determined by the base-emitter current of the transistor 17, so that the mean current flow in the winding 22 is varied to regulate the output voltage as required. The direct connection of the resistors 15, 16 across the battery ensures that the battery voltage is accurately sensed.

The purpose of the resistor 26 and the thermistor 27 is to ensure that the voltage at which regulation commences varies in the required manner with temperature. In some instances it may be desired to keep the regulated voltage constant, but in some circumstances the regulated voltage may be required to increase or decrease with temperature, and such an arrangement can readily be made merely by choosing component values suitably. A parallel circuit may be connected across the resistor 26 and thermistor 27, and include a further resistor and thermistor which are situated in a different part of the vehicle so as to regulate the voltage in accordance with the temperature of a determined component. For example, the second thermistor could be placed in contact with or within the battery, or within the generator to minimise the risk of damage if the generator overheats.

It will be appreciated that by using the base-emitter path of the transistor 17 as the voltage sensing device, the Zener diode which is commonly employed in regulators of the general type shown in the drawing is not required.

The invention can of course be applied to other forms of regulator for controlling the current flow in a field winding, and can also be employed in regulators for use with permanent magnet alternators. In the latter case, regulation is effected by varying the gate currents of thyristors forming part of the full wave rectifier associated with the permanent magnet alternator, and the current flowing through the transistor 17 would be used to control the thyristors.

Having thus described my invention what I claim as new and desire to secure by Letters Patent is:

1. A voltage regulator for use in a battery charging system having a generator which charges the battery and is controlled by varying the current flow in the field winding of the generator, comprising in combination first and second supply lines coupled to the battery, an output transistor having its emitter connected to the second supply line and its collector connected to the first supply line through said field winding, a resistance chain connected across said supply lines, an input transistor having its emitter connected to the second supply line and its base directly connected to said resistance chain, a resistor having one end connected to the first supply line, means coupling the other end of said resistor to the base of the output transistor and to the collector of the input transistor, current flowing through said resistor being effective to turn on the output transistor unless the input transistor is conductive, said input transistor conducting to effect regulation of the generator at a voltage which is determined by the characteristics of the base-emitter diode of the input transistor, without the use of a Zener diode.

2. A regulator as claimed in claim 1 including means for regulating the portion of the output voltage applied across said base-emitter diode with temperature, so that the voltage at which regulation occurs varies with temperature in the required manner.

3. A regulator as claimed in claim 2 including additional means for varying the voltage at which regulation commences in accordance with the temperature of a component in the system which requires protection, for example the generator.

References Cited

UNITED STATES PATENTS

| 3,201,681 | 8/1965 | Van Wilgen et al. | 320—68X |
| 3,252,071 | 5/1966 | Plessis | 320—46 |
| 3,152,298 | 10/1964 | Byles | 322—33X |
| 3,296,516 | 1/1967 | Paine II, et al. | 320—64X |

WILLIAM M. SHOOP, Jr., Primary Examiner

J. M. GUNTHER, Assistant Examiner

U.S. Cl. X.R.

320—64